A. S. DWIGHT.
APPARATUS FOR ROASTING AND SINTERING ORES.
APPLICATION FILED JULY 8, 1910.
Reissued May 28, 1912.
13,423.
2 SHEETS—SHEET 1.
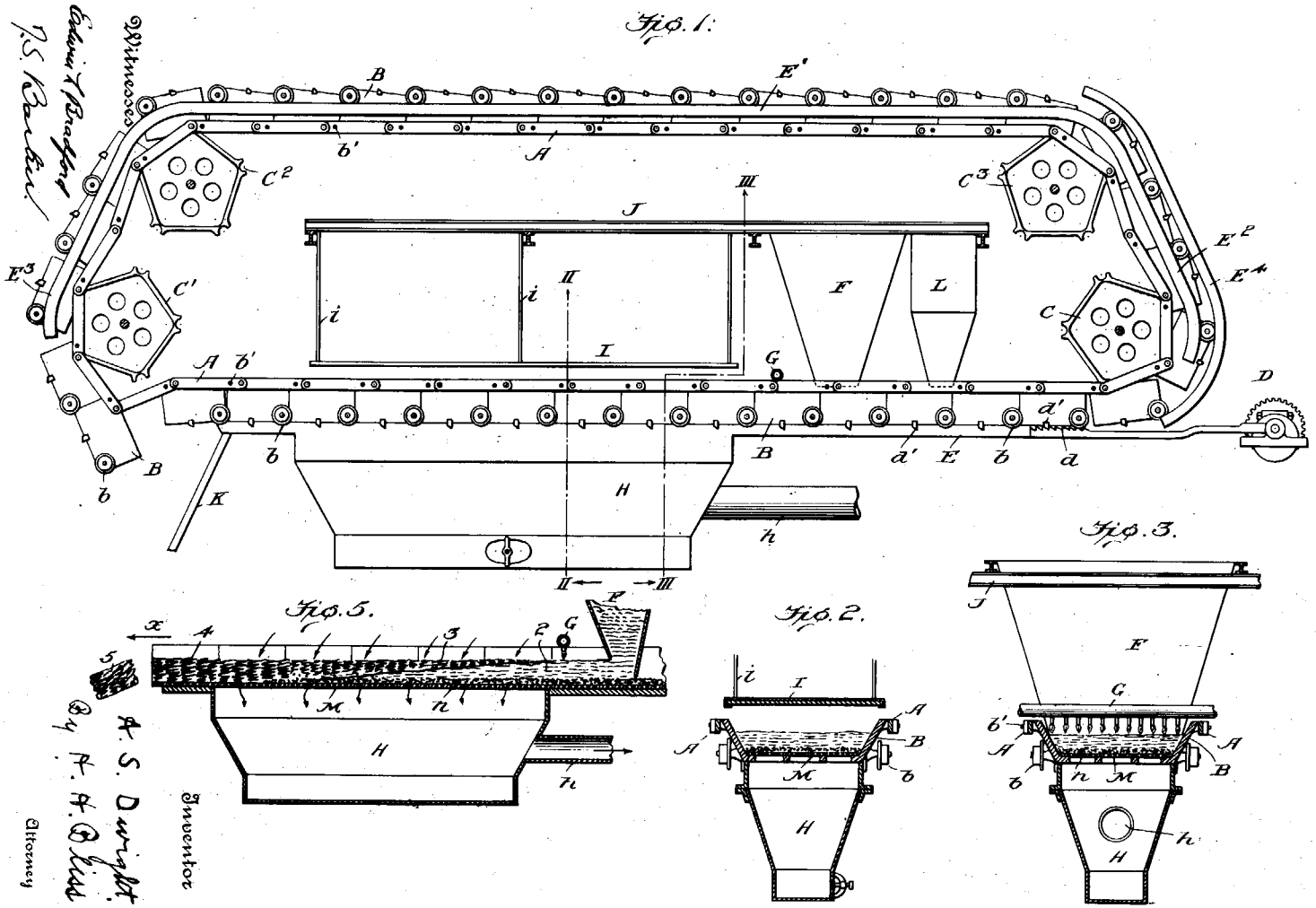

A. S. DWIGHT.

APPARATUS FOR ROASTING AND SINTERING ORES.

APPLICATION FILED JULY 8, 1910.

Reissued May 28, 1912.

13,423.

2 SHEETS—SHEET 2.

Witnesses

Edwin L. Bradford

J. S. Barker.

Inventor

A. S. Dwight

By H. H. Bliss

Attorney

UNITED STATES PATENT OFFICE.

ARTHUR S. DWIGHT, OF NEW YORK, N. Y., ASSIGNOR, BY DIRECT AND MESNE ASSIGNMENTS, TO DWIGHT & LLOYD METALLURGICAL COMPANY, OF JERSEY CITY, NEW JERSEY, A CORPORATION OF NEW JERSEY.

APPARATUS FOR ROASTING AND SINTERING ORES.

13,423. Specification of Reissued Letters Patent. Reissued May 28, 1912.

Original application filed December 14, 1906, Serial No. 347,872. Renewed February 23, 1909, Serial No. 479,498. Original No. 916,391, dated March 23, 1909. Application for reissue filed July 8, 1910. Serial No. 571,102.

DIVISION A.

*To all whom it may concern:*

Be it known that I, ARTHUR S. DWIGHT, a citizen of the United States, formerly residing at Joliet, in the county of Will and State of Illinois, and now residing in New York, in the county and State of New York, have invented certain new and useful Improvements in Apparatus for Roasting and Sintering Ores; and I do hereby declare the following to be a full, clear, and exact description of the invention, such as will enable others skilled in the art to which it appertains to make and use the same.

This invention relates to improvements in the art of treating ores, particularly those which require roasting and sintering—such as sulfur-carrying copper ores—and are of such nature that once being ignited an internal combustion of some content of the ore mass can be maintained, provided an oxidizing atmosphere be supplied.

The invention has for its object to produce apparatus that may be worked automatically and economically in the treatment of ores for the purpose of reducing the said ore to sintered masses of convenient form and nature for subsequent treatment in a blast furnace.

In the accompanying drawings, I have illustrated two forms of mechanism embodying my invention.

Figure 6:
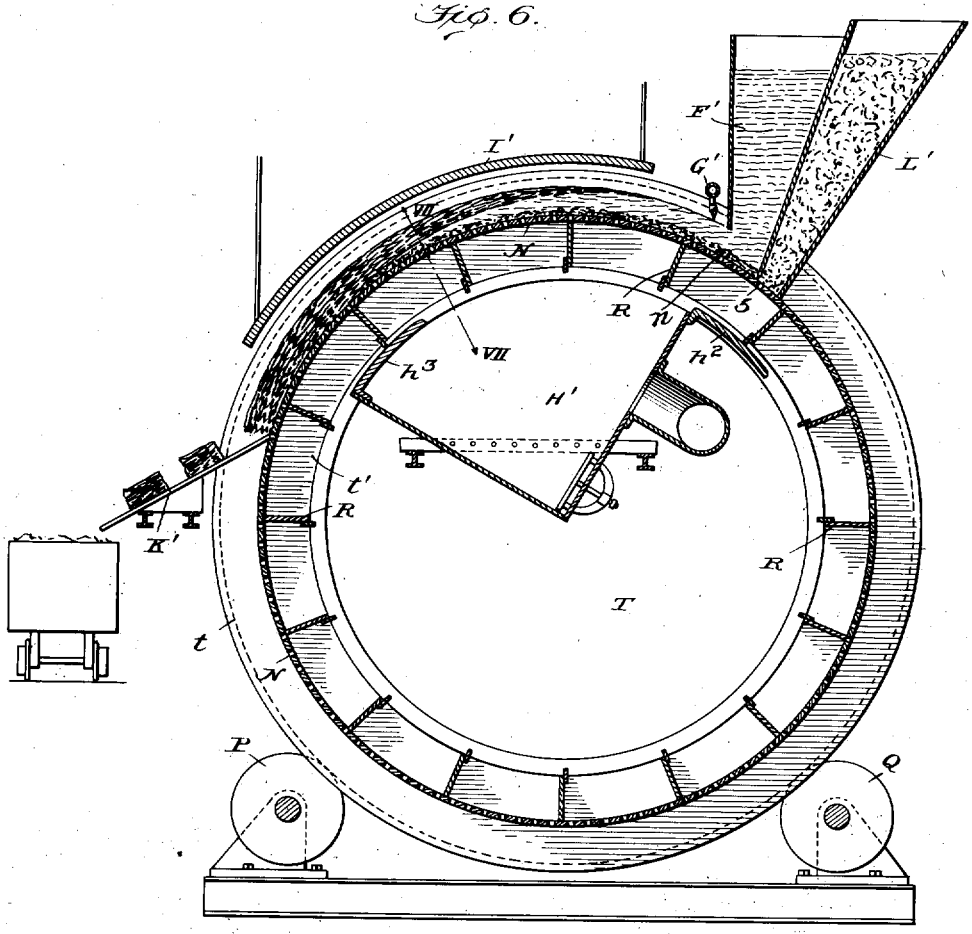
Figure 7:
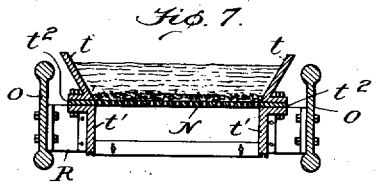
Figure 4:
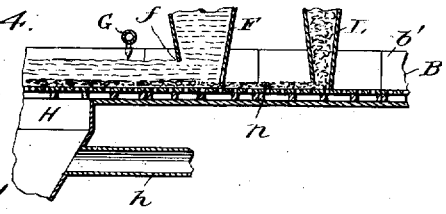

Figure 1 is a side elevation of an apparatus comprising an endless or continuous support or carrier for the ore, the carrier being made up of a series of connected and articulated elements. Fig. 2 is a cross sectional view taken on the line II—II of Fig. 1. Fig. 3 is a cross sectional view taken on the line III—III of Fig. 1. Fig. 4 is a central longitudinal section of a part of the apparatus taken through the feed hopper and contiguous parts. Fig. 5 is a longitudinal sectional view, partly diagrammatic in character, illustrating the process carried on by the apparatus herein shown. Fig. 6 is a vertical sectional view of another form of apparatus embodying my invention. Fig. 7 is a cross sectional view taken on the line VII—VII of Fig. 6.

Referring first to the mechanism shown in Figs. 1 to 4 inclusive the means for supporting the ore during the time when it is subjected to treatment, are represented as composed of an endless system, which, in this case, comprises ore receiving and carrying means and devices, such as chains or cables, for propelling the ore carriers. There can be modification in many respects as concerns these devices, and it will be understood that those which are shown and are herein described are merely selected for the purpose of illustration. In the mechanism shown in the last said figures, A, A, indicate two endless chains which are mounted upon and fitted to sprocket wheels C, C′, $C^2$, $C^3$. B, B indicate ore carrying receptacles, suitably connected to the chains A. Each of these receptacles, buckets, pans or pallets is connected to the chains in suitable manner, as for instance, by pintles at $b'$, the connections being preferably such that the buckets or pallets shall be allowed to drop at certain points in their circuit for the purpose of discharging their contents. $b$, $b$ indicate anti-friction rollers, each bucket or pallet being provided with two of these. The buckets or pallets can be formed of any suitable material, I, at present, preferring to cast them in the manner shown in elevation in Fig. 1 and in section in Figs. 2, 3 and 4. When made as illustrated they have side walls and a grated bottom which can be cast integral with the walls. It will be understood that, in this carrying system, there is provided a substantially continuous ore support. When the parts are constructed and related in the way shown in these figures, the buckets or pallets are situated in horizontal planes below the horizontal planes of the chains, when they are traveling through that part of the circuit where they are in action. To support these buckets or pallets properly I prefer that they should rest upon and move along ways or rails E in the lower part of the system, and I arrange rails E′ in the upper part thereof in position to have the wheels *b*, *b* travel along the same. For the upgoing leg of the system track rails are provided such as shown at $E^3$, these leading to and being substantially continuous with the upper rails E′. And at the down leg there are rails $E^2$ on the under sides of the rollers, and retaining rails or bars $E^4$ which lie on the outside of the rollers as they move downward, the rails $E^2$ connecting with those at E′ above. In this mechanism, a continuously progressive movement or advance of the carrier system is effected by the driving devices indicated as an entirety by D, and having ratchet pawls *d* or equivalents, the teeth or serrations of which are adapted to engage with lugs *d′* projecting laterally from the buckets or pallets or other suitable part of the carrier. The speed of advance can be regulated as occasion requires.

The material to be treated is delivered to the ore receiving and carrying devices in any suitable way. I prefer to employ a hopper or bin-like device, such as indicated at F, from which the ore can pass either in a continuous regulated stream, or from which it can be delivered by any well known feeding apparatus. It is desirable to so deliver the ore to the carrier that a stream or mass thereof shall be formed which is substantially uniform in depth and width, and this end can be reached either by properly regulating the downward movement of material from the hopper, or by supplying distributing devices. In practice, I have found that under all ordinary circumstances it is sufficient to have the bottom opening of the hopper of proper size and to extend downward the front hopper wall at the bottom so as to serve as a leveling or scraping flange or lip *f* which insures the proper depth of the ore.

It will be understood that the mechanism and process of this case are mainly designed for the treatment of "fines" or reduced ore, and when such material is being passed into the carrier, the particles being substantially uniform in size, the hopper bottom can be so regulated as to permit the passage of a constant stream which can be leveled off as described. Immediately after the material has been delivered properly to the carrier, it is ignited at the top surface. This igniting can be accomplished in any suitable way. As illustrated in the drawings, I provide an ignition pipe at G, which may be connected to a gas supply of any available sort; and adapted at will to throw a flame or jets of flame upon the top surface of the ore as it passes below. This igniting device is arranged transversely across and close to the exposed surface of the ore layer, so that the latter is rapidly, uniformly and thoroughly ignited as it moves past the igniter.

The bottoms of the buckets, pans, or pallets B, as above described, are formed with openings. If formed with cast grate like bars such as already described, these may, in some cases, be used to directly support the ore, but I prefer to utilize them rather as supports for sheets of perforated reticulated metal M. As will be explained more fully below the bottom parts of the carriers are liable to rapid impairing and destruction from corroding and other causes. By supplying separately formed detachable bottom elements they can be readily removed after they have become impaired, without requiring the removal of the entire bucket or pallet. The apertures or openings through the bottom of the bucket are for the purpose of permitting the downward passage of currents of air.

H indicates an air or suction box or trunk situated below the ore carrier. The walls of this air box at their upper edges are so arranged as to fit as tightly as possible to the bottom edges of the buckets or pallets as they move over them so as to maintain an air tight joint. Their lower parts are so shaped as to assist in collecting the air which is drawn from the box or trunk H through the duct at *h* by any suitable exhaust apparatus, such as a suction fan or chimney stack. The air that is thus drawn into the box or trunk H comes from the region above the mass of ore which is slowly traveling over the trunk. This air enters the mass of ore and passes down through the interstices therein supplying the oxygen necessary for the combustion of the combustible elements. It is desirable in most cases to retain as much as possible of the heat which is generated by the combustion referred to, and to prevent its loss by radiation upward I employ a hood or shield I of suitable material such as a sheet of steel or iron which is arranged a short distance above the tops of the buckets or pallets and can to advantage be in plan area approximately commensurate with the plan area of the air box or trunk H. This shield or hood may be supported in any suitable way. I have shown it as being carried by hanger rods *i* which at their upper ends are secured to frame bars or beams at J. The air which is drawn into and through the mass of ore can enter with sufficient freedom into the space below the shield or hood.

After the ore has been subjected to the treatment, which will be more fully referred to, it reaches the discharging point. At a suitable distance beyond the trunk or air box H the supporting tracks E terminate and when the sections of the endless carrier reach the ends of the track rails they drop, turning upon their hinges or pintles *b′* which, as will be seen, are at the front end of each of the buckets or pallets. Preferably the parts are so arranged and related that the dropping will be accompanied by more or less of a shock or jar which insures the complete emptying of the contents. If desired a chute or apron-like plate can be employed as shown at K against which the dropping ore can fall as it leaves the pallet and by which it can be guided to any desired place of deposit.

Under some circumstances, and for purposes which will be more fully referred to, it is desirable to provide the grate like bottom of each bucket or pallet with a layer *n* of inert or refractory material for the purpose of assisting in preserving the bottom part of the carrier from destruction. At present I will mention lime rock as a substance which can be used for this purpose. When employed it is placed in a suitably thick layer upon the bottoms of the pallets or buckets at times before they are charged with the ore. In the apparatus which I have been describing provision is made for supplying a material of this character automatically, although it will be understood that the end aimed at by the characteristic features of my process can be reached if this material were applied manually. L indicates a hopper or bin also arranged and supported directly above the lower part of the carrier. It is supplied with a requisite amount of the material that is to be deposited on the bottom of the carrier, and the layer that is there placed is ready to receive the superincumbent mass of ore which is subsequently introduced from the hopper F in the way above described.

Having thus set forth the principal matters incident to the construction and arrangement of the parts I have illustrated in Figs. 1 to 4 inclusive, the following is to be noted with respect to the mode of operation. If it be assumed that the hopper or bin at F is charged with the ore that is to be treated, and that the hopper at L is charged with the refractory material to be employed, and that the movable and operative parts of the mechanism are set in proper motion the following will be the results. As each pallet or bucket passes beneath the hopper L it is provided with a shallow layer of the refractory material which while covering the grated or reticulated bottom element of the bucket is sufficiently porous or open to permit the downward passage of gases and products of combustion. Then as the buckets or pallets successively reach the vertical lines of the hopper or bin F they are next supplied with the ore which lies upon the layer of refractory material and is of a depth made as uniform as possible through the series. Then as the pallets or buckets successively reach the transverse line of igniting the upper part of the ore is ignited by such means as are adopted. At an early moment after the ignition the newly ignited area at the top of the advancing stream comes into the vertical planes of the area of downward air suction, whereupon the ignition is insured and continued so long as the material is above the air box or trunk H or until the oxidizable components have been exhausted. Let it be assumed that the material which is to be treated is a copper sulfid ore of average natural character. The firing having been commenced in the way described it will continue, the fire extending gradually deeper and deeper into the mass until it has reached the bottom. The various factors including the speed of travel of the carrier, the depth of the mass thereon, and the proportion of oxidizable ingredients, are so adjusted and related that the process of combustion shall continue until just about the time when the material reaches the remote end of the air box or trunk H.

Inasmuch as many of the incidents to a process such as is followed in employing this apparatus have been fully presented and described in the applications for patent heretofore filed by myself jointly with Richard L. Lloyd, namely Serial No. 307,431, filed March 22, 1906, and Serial No. 328,387, filed July 30, 1906, which have matured respectively into Patents Nos. 882,517 and 882,518, dated March 17, 1908, it is not necessary to here repeat the description thereof.

As remarked at other places herein the present process embodies features of improvement upon the matters set forth in the aforesaid earlier patents, and the present description is related more directly thereto. In one of the said earlier patents provision was made for passing pallets or bucket like carriers in continuous series through the region of treatment; and while the process carried out by devices of that sort is of great importance and constitutes a great advance in the art I have discovered that better results can be attained as concerns uniformity in the treatment and accuracy in the adjustment of the several parts, as well as a great saving in labor and expense, by prolonging the series of carriers and making it endless so that the different sections after successively passing through the region of treatment can be automatically discharged or emptied and automatically returned to the points where the series of steps is recommenced. I have also learned from further experience that variations in speed can to advantage be provided for to correspond to the varying factors in the material to be treated, and that the ore and its protecting layer can be more advantageously deposited with means substantially such as those herein set forth.

Of course it will be understood that there can be many modifications without departing from the essential features of the invention, both in respect, as above remarked, to the construction and arrangement of the devices, and also in respect to the manner of using.

I above referred to the use of lime rock as a suitable material for the initial layer at the bottom of the ore mass; and in this connection the following is to be noted.

The bottom element of the ore carrier, whether it be an integral grate or a separately formed apertured bottom element, should be constructed of a material capable of economically resisting the destructive agencies to the action of which it is subjected when in operation, these being hot sulfurous and other corrosive gases, water vapor, hot metallic sulfur and other metalloids or metals which may liquate down from the mass of superincumbent material that is undergoing treatment. They are also liable to impairment from sudden changes in temperature. The severity of these conditions varies with different kinds of material, being the greatest when the proportion of sulfur is high. With a low content of sulfur the temperature generated during the operation and the temperature of the resulting gases does not rise very high, and a grate of cast iron or of perforated wrought iron plate will suffice. Where higher temperatures are generated perforated copper plates have been used to advantage and also perforated asbestos board. Use may be made also of grates formed of bars or plates of refractory earth material, bricks, fire clay, porcelain or the like. Water cooled pipes or grate bars may be used. But whatever materials or devices are used to serve as bottom elements for the carrier it is of advantage to protect them as far as possible from the action of the heated gases and fluid. And hence it is that I make provision, as above described, for supplying a layer of inert or refractory character to lie between the bottom support, proper, and the superincumbent mass of ore.

I have above referred to lime rock suitably reduced in size of particles as one body that can be used for this purpose; but here also there can be variation as desired. Good practice requires that the material chosen for this purpose of protecting the carrier bottom should be of such composition that it can be present together with the treated ore during the later steps of treatment, for example during the smelting operation, without impeding such operation or impairing its results, commercial or metallurgical. Instead of the limestone mentioned use can be made of oxid iron ore, silicious or earthy ores, poor in sulfids, which ores may be not only not hurtful but desirable ingredients in the blast furnace mixture. Or in lieu of these or any of them use may be made of a layer of sintered ore suitably reduced.

As heretofore remarked the continuity of the process and the continuous motion of the carrier do not depend upon details identically similar to those that have been above described. The different sections of the carrier or ore support may be rigidly connected together, in which case they should be arranged to rotate around a common center. In that event the carrier becomes of the nature of a drum which can have its parts so constructed and related that the material to be treated can be fed to the interior or concave side of the structure, or can be fed to the exterior or convex side. A mechanism such as last referred to is illustrated in Figs. 6 and 7. Here as above remarked the carrier consists of a circular series of sections forming what may be regarded as a drum. As an entirety it is indicated by T. It has the external flanged walls *t*, the inward projecting ring sections *t'* and the ore supporting parts at N. The latter preferably consists of perforated or barred sections which are clamped in place.

The support for the drum structure consists of the rings or tires O which are either continuous around the circle or formed in sections secured together. These rest upon and are actuated by rollers P and Q which are grooved or flanged to hold them in place.

R, R indicate girder bars which extend from one of the supporting rings O to the other, and to which they are firmly bolted. The aforesaid ring sections *t'* are respectively placed between these cross girders R and secured to them. They have outwardly extending flanges by means of which the flanges of the outer wall pieces *t* are bolted in place. Between the inner drum skeleton formed of the parts R and *t'* and the outer walls or flanges *t* are clamped the sections N which serve as a grating or bottom support for the ore. At $t^2$ spacers are introduced which relieve the parts N from undue weight and pressure.

It will be seen that an ore carrying structure made and supported in the way last described can be utilized in a manner quite similar to that in which is used the endless carrier first above described. At L' there is a hopper for refractory material and at F' a hopper for the ore. These are supplied with their respective materials and supply the same to the apertured support in a manner substantially similar to that above described. I' indicates a hood or shield suspended above the forward traveling ore mass, it conforming to the curved path of the material instead of lying in a plane as in the other mechanism. There is here a firing or igniting duct at G' corresponding to the one in the other construction.

The air which is drawn through the ore is collected in a box or trunk at H′ situated in the chamber or space in the interior of the drum. The inwardly extending cross plates or bars R are utilized as cut offs for the air. They successively rotate over the air box or trunk and as they approach it move in close proximity to a plate $h^2$. As they recede from it they move in proximity to the plate $h^3$ at the other edge of the trunk, there being at all times one of these cross bars or girths close to each of these plates; and consequently the entrances for air are cut off in all directions except through the mass of ore. The air is withdrawn from the box H′ by a suction apparatus such as above described. It will be seen that the inner drum skeleton already referred to, and consisting of the ring sections $t'$ and the cross plates R, form a series of movable air chambers arranged inside the grate-like ore support and adapted to be brought successively into communication with the stationary air chamber H′ situated inside the cylinder or drum-like ore carrier.

With the present mechanism the ore, after treatment, can be removed in any suitable way. Preferably there is a chute at K′ arranged to come close to the bottoms of the ore receptacle. As the different parts of the latter reach this chute the ore is taken off automatically and guided by the chute to any suitable place of deposit or to a suitable vehicle.

Numerous other modifications will suggest themselves to those skilled in the art. An endless carrier can be made in either of several ways, two of which have already been set forth. Instead of these a horizontally rotated table-like or ring-like structure can be used, the table or ring part of which can be made as an ore receptacle with an apertured bottom rotating in horizontal planes instead of in vertical.

In Fig. 5 I have illustrated by a diagrammatic view the process that is carried on in an apparatus such as I have described. The ore mass there represented is fed in the direction of the arrow $x$, and the grate M upon which it is supported is supposed to move therewith. At $n$ there is represented a thin layer of refractory material resting directly upon and serving to protect the grate. Upon this is fed, through the hopper F, the ore mass 2, which is preferably in a moist condition. Along a line just in advance of the front edge of the air or suction box H, the top of the ore mass is ignited, as by means of the burner G. Combustion thus being started is maintained by the atmospheric air, which is freely supplied thereto and is caused to pass transversely through the moving ore mass, as indicated by the small arrows. As the ore mass advances in the direction of the arrow $x$, the line of combustion, designated in a general way by the diagonal line 3, gradually advances downward or toward the grate surface M. The speed of movement of the ore mass is so regulated, with reference to the length of the air trunk H, that by the time the mass arrives at the rear or farther edge of the trunk the line of combustion has reached the bottom of the ore mass, when the entire body of ore will have been changed from a pulverulent condition indicated at 2, to a sintered mass, indicated at 4, which latter may be broken into conveniently sized pieces 5, for subsequent handling and treatment.

In the Patent No. 916,392, granted to me March 23, 1909, I have illustrated a construction having a series of air chambers connected to and rotating with a horizontally arranged ore carrier, and therein I present claims which are specific to the construction there disclosed. In the present case, I present claims relating to such air chambers which are not intended to be limited either to the details of construction shown in said Patent No. 916,392, or to the specific forms of invention disclosed in this case.

In another patent granted to me March 23, 1909, No. 916,397, I present description and claims for a process relating to the sintering in one mass of a body of relatively fine ore and a body of other matter, such as coarse ore, rock, or the like; and herein present claims relating to the mechanism by which such a process can be carried out and the product thereof obtained. In still another patent granted to Richard L. Lloyd and myself jointly on the 23rd day of March, 1909, No. 916,393, there is presented an apparatus comprising, with other elements, an endless ore carrier made up of sections flexibly connected together, and in Patent No. 916,394, granted to us jointly on the 23rd day of March, 1909, there is presented a mechanism having an ore support, which is therein illustrated as of drum-like character and mounted on a horizontal axis; and in the said joint patents respectively, are presented the broader claims relative to such mechanisms respectively, the claims herein made involving such structures relating to improvements thereon and parts combined therewith.

I do not in this case (Division A of the reissue of Patent No. 916,391) claim the improved method of treating metalliferous ores, consisting in placing upon a support pervious to a supporter of combustion, a layer of stone, rock, or similar material, placing upon said layer a body of said ore, causing a supporter of combustion to pass through said body of ore, and temporarily applying burning products to the combustible elements in the ore; nor the improved metalliferous product resulting from the working of the said method, as such subjects-matter are claimed in another case filed simultaneously herewith and designated Division B, of the aforesaid reissue.

What I claim is:—

1. In an apparatus for treating ores, substantially as described, the combination with a movable ore support adapted to have streams of combustion-supporting gas pass through the ore mass on lines transverse to its line of travel, of a hood or reflector for the heat arranged above the upper surface of the ore mass as it is carried by the said support; substantially as set forth.

2. In an apparatus for treating ores, substantially as described, the combination with a movable ore support, of air inducing apparatus on one side of the ore support for causing currents of air to pass through the moving mass of ore on the said support, and a hood or reflector for the heat generated in the said ore mass, and arranged on the opposite side of the ore support; substantially as set forth.

3. In an apparatus for treating ores, substantially as described, the combination of a movable ore support, adapted to carry a bed or layer of ore, air inducing apparatus on one side of the ore support adapted to cause currents of air to pass through the ore mass, and a hood or reflector for the heat arranged adjacent to the ore mass and substantially parallel with the line of travel thereof and on the side of the ore support opposite the said air inducing apparatus; substantially as set forth.

4. In an apparatus for treating ores, substantially as described, the combination with a movable ore support, of means for feeding a stream or layer of ore thereto, and means for supplementally feeding a layer or stream of material to the support in contact with the layer or stream of ore, substantially as set forth.

5. In an apparatus for treating ores, the combination with the moving ore support, of means for supplying a stream or layer of relatively coarse material to the said ore support and supplemental means for supplying a stream or layer of relatively fine ore and depositing it upon the aforesaid stream or layer of relatively coarser material, substantially as set forth.

6. A supporting and carrying device for holding ore while being subjected to treatment having, in combination, an apertured bottom, and ring-like or tire-like supports detachably connected with the ore holder and adapted to be supported on rollers.

7. An apparatus for supporting and conveying ore while it is under treatment having, in combination, an apertured bottom or floor element concentrically arranged about a center or axis of rotation, flanges or projections extending inward toward the center, flanges or holders for the sides of the ore mass, and supplemental ring-like or tire-like supports secured to the inwardly projecting parts and adapted to rest upon anti-friction rollers, substantially as set forth.

8. In an apparatus for holding and conveying ore, the combination with an apertured support arranged substantially cylindrically, supporting devices for the apertured support extending inward therefrom, ring-like or tire-like carriers attached to the supporting devices and adapted to rest upon anti-friction rollers, and an air chamber in the interior of the apertured support.

9. In an apparatus for holding and conveying ore during treatment, the combination of a cylindrically arranged apertured ore support, ore retaining flanges or walls secured to and extending outward from the ore support, holding devices for the ore support extending inward therefrom, ring-like or tire-like carriers for the holding devices detachably secured thereto and adapted to rest upon anti-friction rollers, and an air chamber in the interior of the apertured support, substantially as set forth.

10. In an apparatus for holding and conveying ore while it is being treated, the combination of a cylindrically arranged apertured ore support, a series of air chambers inside of the lines of the ore support and moving therewith, and a stationary air chamber inside of the movable air chambers, substantially as set forth.

11. In an apparatus for holding and conveying ore while it is being treated, the combination of a cylindrically arranged apertured ore support, annular walls extending inward from the ore support, radially arranged partitions extending across the space between said annular walls, and a stationary air chamber inside of the said partitions.

12. In an apparatus for conveying ore while being roasted, the combination of a rotatable, apertured ore support, a stationary air box in close proximity to which the ore support is moved, and air cutoffs at the front and rear edges of the air box, substantially as set forth.

13. In an apparatus for conveying ore while being roasted, the combination of a rotatable, apertured ore support, a stationary air box in close proximity to which the ore support is moved, air cut off plates arranged at the front and rear edges of the air box, and cross pieces carried by the ore support arranged to move across the surface of the said air cut off plates, substantially as set forth.

14. In an apparatus for treating ore, the combination of a supporting frame rotatable about an axis and carrying perforated grate-like supports for the ore, a series of air chambers arranged adjacent to the ore supports and rotatable therewith, and means for causing air to pass through the ore being treated to maintain active combustion therein, connected with the several air chambers, substantially as set forth.

15. In an apparatus for treating ore, the combination of perforated grate-like sections for supporting the ore arranged in a circular series about an axis, means for moving the grate sections around the axis, air chambers arranged respectively adjacent to the ore-supporting grate sections and movable therewith, and means for causing air to pass through the ore, the air chambers and the grate sections while these are in motion in order to maintain combustion in the ore being treated, substantially as set forth.

16. In an apparatus for treating ore, the combination of a series of air chambers, a series of grate sections located respectively above the said air chambers, means for retaining ore upon the grate sections, a rotary holder for the said grate sections and air chambers, and means for causing air to pass through the said air chambers and through the said grate sections, and through the ore, said means comprising air conduits situated inside the circles of rotation of the ore bodies, substantially as set forth.

17. In an apparatus for treating ore, the combination of perforated grate-like sections for supporting the ore while being treated arranged in a circular series, means for moving the grate sections in a circular path, means for feeding ore to the grate sections, means for igniting the combustible constituents of the ore after being placed on the grate sections, air chambers arranged respectively adjacent to the ore-supporting grate sections, and movable therewith, and means for causing air to pass through the ore, the air chambers and the grate sections while these are in motion, substantially as set forth.

18. In an apparatus for treating ore, the combination of perforated grate-like sections for supporting ore arranged in a circular series, means for moving the grate sections in a circular path, means for feeding ore to the grate sections, air chambers arranged respectively adjacent to the ore-supporting grate sections and movable therewith, means for causing air to pass through the ore, the air chamber and the grate sections while these are in motion to maintain combustion in the ore, and means for cutting off the air chambers from the said means for causing movement of the air, after the ore has been treated, substantially as set forth.

19. In an apparatus for treating ore, the combination of perforated grate-like sections for supporting ore arranged in circular series, means for moving the grate sections in a circular path, means for feeding ore to the grate sections, air chambers arranged respectively adjacent to the ore-supporting grate sections and movable therewith, means for causing air to pass through the ore, the air chambers and the grate sections while these are in motion to maintain combustion in the ore, means for cutting off the air chambers from the said means for causing movement of the air, after the ore has been treated, and means for removing the treated ore from the grate sections while cut off from the means for causing air movements.

20. In an apparatus for treating ore, the combination of a series of grate sections for supporting the ore, a series of air chambers under said sections, and means adapted to be connected with each air chamber for causing air to pass through the ore mass on the grate sections, substantially as set forth.

21. In an apparatus for treating ore, the combination of an endless ore support or carrier, a series of separate air chambers arranged under or adjacent to the ore support, and means for successively connecting the said air chambers with means for causing air to pass through the ore masses above the chambers, substantially as set forth.

22. In an apparatus for treating ore and transporting it while combustion is being caused within the ore mass, the combination of an endless movable ore support, and a series of air chambers communicating with the ore support and movable therewith, substantially as set forth.

23. In an apparatus for treating ore and transporting it while combustion is caused within the ore mass, the combination of an ore support, means for moving the support, a series of air chambers communicating with the support, means for causing movement of air to support combustion in the ore mass and connected with the said air chambers, and means for putting the said air chambers in communication with and cutting them off from the said air-moving means, successively, substantially as set forth.

24. In an apparatus for treating ore, the combination of ore supporting grate sections arranged in a circular series about a center, a series of air chambers under the grate sections, means for turning the grate sections and air chambers together about the said center, and a means common to the said air chambers arranged to cause air to pass through the grate sections and the ore supported thereon, substantially as set forth.

25. In an apparatus for roasting and sintering ore, the combination of a movable support for the ore having a grate surface, a layer of pervious and relatively inert and refractory material above the said grate surface, means for feeding the ore to be treated upon the said layer of material, and means for causing a current of air to pass transversely through the ore mass while upon the support to maintain combustion in the mass, substantially as set forth.

26. In an apparatus for roasting and sintering ore, the combination of an endless support having a pervious bottom, means for feeding a layer of inert material to the said pervious surface of the ore support, means for feeding the ore to be treated upon the said layer of inert material, means for moving the support, and means for causing a current of air to pass transversely through the ore, the layer of inert material and the grate surface, substantially as set forth.

27. In an apparatus for treating ore, the combination of a support pervious to a supporter of combustion, means for feeding upon the said support a layer of ore, and means for supplementally feeding another layer of material to the support in contact with the said layer of ore, substantially as set forth.

ARTHUR S. DWIGHT.

Witnesses:
EDWIN H. MESSITER,
CHARLOTTE M. STANLEY.